United States Patent
Umezawa et al.

(10) Patent No.: US 9,491,306 B2
(45) Date of Patent: Nov. 8, 2016

(54) SIGNAL PROCESSING CONTROL IN AN AUDIO DEVICE

(71) Applicant: Broadcom Corporation, Irvine, CA (US)

(72) Inventors: Taro Umezawa, New Westminster (CA); Franck Beaucoup, Vancouver (CA)

(73) Assignee: Broadcom Corporation, Irvine, CA (US)

(*) Notice: Subject to any disclaimer, the term of this patent is extended or adjusted under 35 U.S.C. 154(b) by 438 days.

(21) Appl. No.: 13/925,555

(22) Filed: Jun. 24, 2013

(65) Prior Publication Data
US 2014/0349638 A1 Nov. 27, 2014

Related U.S. Application Data

(60) Provisional application No. 61/827,437, filed on May 24, 2013.

(51) Int. Cl.
| | | |
|---|---|---|
| *H04B 1/38* | (2015.01) | |
| *H04M 9/08* | (2006.01) | |
| *H04M 3/00* | (2006.01) | |
| *H04W 24/02* | (2009.01) | |
| *H04B 1/10* | (2006.01) | |
| *G10L 21/0208* | (2013.01) | |

(52) U.S. Cl.
CPC ............ *H04M 9/082* (2013.01); *H04M 3/002* (2013.01); *G10L 2021/02082* (2013.01); *H04B 1/109* (2013.01); *H04W 24/02* (2013.01)

(58) Field of Classification Search
CPC .......... H04R 2410/00; H04R 2410/01; H04R 2410/03; H04R 2410/05; H04R 2410/07; H04R 2460/01; H04W 88/02; H04W 24/02; H04B 3/23; H04B 1/109; H04B 3/20; H04M 9/082; H04M 1/58; H04M 9/08; H04M 3/002; H04M 1/6033; H04M 1/03; H04M 3/2236; H04M 9/087; H04M 1/2535; G10L 2021/02082; G10L 21/0208

USPC ................ 455/570; 370/286, 287, 288, 289; 379/406.1, 399.01, 387.01, 406.01, 379/406.03–406.06; 381/71.1, 83, 94.1, 95, 381/96

See application file for complete search history.

(56) References Cited

U.S. PATENT DOCUMENTS

| | | | | |
|---|---|---|---|---|
| 4,081,620 | A * | 3/1978 | Goodman et al. | 379/391 |
| 4,591,670 | A * | 5/1986 | Itoh | H04B 3/20 370/288 |
| 5,487,102 | A * | 1/1996 | Rothschild | H04M 1/60 379/223 |
| 5,526,347 | A * | 6/1996 | Chen et al. | 370/290 |
| 5,640,450 | A * | 6/1997 | Watanabe | H04M 1/585 379/390.01 |
| 6,912,209 | B1 * | 6/2005 | Thi | H04B 3/23 370/286 |
| 2004/0179676 | A1 * | 9/2004 | Okuda | H04B 3/23 379/399.01 |
| 2005/0129224 | A1 * | 6/2005 | Piket et al. | 379/406.01 |
| 2006/0029214 | A1 * | 2/2006 | Johnston | H04B 3/23 379/406.01 |
| 2006/0198511 | A1 * | 9/2006 | Su | H04B 3/234 379/406.01 |
| 2010/0022280 | A1 * | 1/2010 | Schrage | 455/567 |
| 2010/0130247 | A1 * | 5/2010 | Junge et al. | 455/550.1 |
| 2014/0119581 | A1 * | 5/2014 | Tsingos et al. | 381/300 |

\* cited by examiner

*Primary Examiner* — Olumide T Ajibade Akonai

(74) *Attorney, Agent, or Firm* — Fiala & Weaver P.L.L.C.

(57) ABSTRACT

Methods, systems, and apparatus for controlling audio signal processing are described herein. In accordance with certain embodiments, a measure of coupling between at least one microphone and one speaker associated with an audio device is obtained. The measure of coupling may be used to control audio signal processing, such as sidetone generation and application of multi-channel decorrelation to the audio signal.

20 Claims, 8 Drawing Sheets

SIGNAL PROCESSING CONTROL IN AN AUDIO DEVICE

CROSS-REFERENCE TO RELATED APPLICATIONS

This application claims the benefit of U.S. Provisional Application No. 61/827,437, filed on May 24, 2013, which is incorporated by reference herein in its entirety.

BACKGROUND

1. Technical Field

The subject matter described herein generally relates to techniques for controlling the processing of audio signals to be played back by an audio device. In particular, the subject matter described herein relates to techniques for controlling the addition of sidetone to an audio signal to be played back by a telephony device and controlling the application of multi-channel decorrelation to audio signals to be played back by an audio device.

2. Description of Related Art

In audio communication systems, such as telephony systems, a speech signal captured by a remote or "far-end" telephony device is transmitted to a local or "near-end" telephony device and played back over one or more loudspeakers. At the near-end, the speech signal may be referred to as the "receive signal." For a variety of reasons, the receive signal may be processed prior to playback.

For example, sidetone may be generated and added to the receive signal prior to playback thereof. Sidetone is a deliberate feedback of a near-end speaker's own speech signal (which may be referred to as the "send signal") into the path of the receive signal. The presence of sidetone indicates an active telephone connection. When a telephony device is operated in a handset mode or when the receive signal is played back over a headset or a pair of headphones that have been connected to the telephony device, it is typically considered desirable to have sidetone. However, when the telephony device is operated in a hands-free mode or when the receive signal is played back over one or more external powered loudspeakers, sidetone is typically considered undesirable due to the possibility of acoustic echo.

As another example, when the receive signal comprises a multi-channel signal (e.g., a stereo signal having left and right channels), multi-channel decorrelation may be applied to the different channels prior to playback thereof. Multi-channel decorrelation is intended to help a multi-channel acoustic echo canceller distinguish between the different channels for the purposes of performing acoustic echo cancellation. Multi-channel decorrelation reduces the degree to which the different channels of the multi-channel receive signal are correlated by introducing a distortion (e.g., non-linearities) thereto. When a telephony device is operated in a handset mode or when the multi-channel receive signal is played back over a headset or a pair of headphones that have been connected to the telephony device, it may be deemed undesirable to apply multi-channel decorrelation, since acoustic echo may not be an issue. In such a case, there may be no reason to consume processing resources applying the technique. Furthermore, in such a case, there may be no reason to intentionally introduce a distortion into the receive signal as it may be noticeable by a user. However, when the telephony device is operated in a hands-free mode or when the receive signal is played back over one or more external powered loudspeakers, the application of multi-channel decorrelation may be considered desirable due to the possibility of acoustic echo.

A telephony device may not be capable of determining the type of device that is currently being used to play back the receive signal. This may be true, for example, when a user connects external powered speakers or a headset or headphones to the telephony device. If the telephony device is not capable of determining the type of speaker to which it is connected, then it may not be able to determine what type of receive signal processing may be appropriate for the type of speaker that is being used. This may result in, for example, sidetone being added to the receive signal when it is not desired or multi-channel decorrelation being applied to the receive signal when it is not beneficial or potentially harmful from an audio quality standpoint to do so.

BRIEF DESCRIPTION OF THE DRAWINGS/FIGURES

The accompanying drawings, which are incorporated herein and form a part of the specification, illustrate the subject matter of the present application and, together with the description, further serve to explain the principles of the embodiments described herein and to enable a person skilled in the pertinent art to make and use such embodiments.

Figure 1:
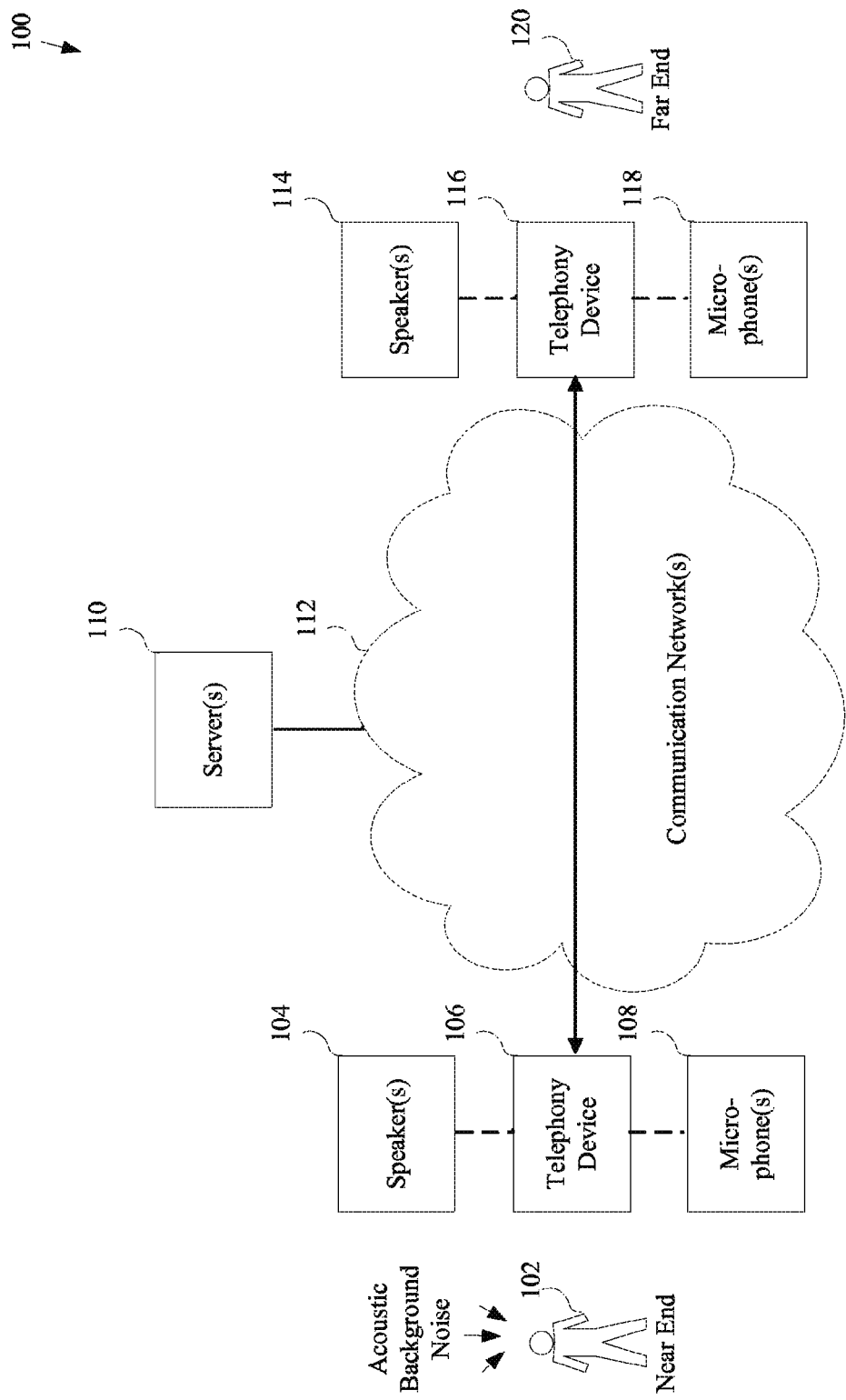
FIG. 1 is a block diagram of an example audio communication system in which embodiments for controlling receive signal processing may be implemented.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

A. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to affect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, disclosed embodiments may be combined with each other in any manner.

Methods, systems, and apparatus for controlling receive signal processing are described herein. In accordance with certain embodiments, a measure of coupling between at least one microphone integrated with or communicatively connected to a telephony device and at least one speaker integrated with or communicatively connected to the telephony device is obtained. The manner in which a receive signal is processed is then controlled based on the measure of coupling.

For example, in certain embodiments, the measure of coupling is used to determine whether or not sidetone should be combined with the receive signal and/or to determine the strength of the sidetone to be combined with the receive signal. For example, embodiments can add sidetone or increase the strength thereof when the measure of coupling is relatively low, as would likely be the case when the telephony device is being operated in a handset mode or when the receive signal is played back over a headset or a pair of headphones that have been connected to the telephony device. Conversely, embodiments can disable the addition of sidetone or decrease the strength thereof when the measure of coupling is relatively high, as would likely be the case when the telephony device is operated in a hands-free mode or when the receive signal is played back over one or more external powered loudspeakers. This type of control can be advantageously achieved without requiring that the telephony device be able to determine what type of speaker is currently being utilized.

As another example, in certain embodiments, the measure of coupling is used to determine whether or not multi-channel decorrelation should be applied to a multi-channel receive signal and/or to determine the degree of multi-channel decorrelation to be applied to the multi-channel receive signal. For example, embodiments can disable multi-channel decorrelation or reduce the degree to which multi-channel decorrelation is applied when the measure of coupling is relatively low, as would likely be the case when the telephony device is being operated in a handset mode or when the receive signal is played back over a headset or a pair of headphones that have been connected to the telephony device. Conversely, embodiments can apply multi-channel decorrelation or increase the degree to which multi-channel decorrelation is applied when the measure of coupling is relatively high, as would likely be the case when the telephony device is operated in a hands-free mode or when the receive signal is played back over one or more external powered loudspeakers. Again, this type of control can be advantageously achieved without requiring that the telephony device be able to determine what type of speaker is currently being utilized.

In an alternate embodiment, the telephony device is configured to automatically obtain product information about one or more audio playback devices to which the telephony device is connected. For example, the telephony device may include handshaking logic that is configured to receive one or more messages from the audio playback device(s) and to extract product information about the audio playback device(s) from the one or more messages. The telephony device may then use such product information to control the processing of a receive signal to be played back by the telephony device. For example, if the product information suggests that the audio playback device(s) comprise a headset or a pair of headphones, then sidetone may be added or the strength of the sidetone may be increased. However, if the product information suggests that the audio playback device(s) comprise one or more external powered loudspeaker, then the addition of sidetone may be disabled or the strength of the sidetone may be decreased. As another example, if the product information indicates that the audio playback device(s) comprise a headset or a pair of headphones, then multi-channel decorrelation may be disabled or the degree of multi-channel decorrelation that is applied may be reduced. However, if the product information suggests that the audio playback device(s) comprise one or more external powered loudspeakers, then multi-channel decorrelation may be applied or the degree of multi-channel decorrelation that is applied may be reduced.

B. Example Audio Communication System in which Embodiments May be Implemented

FIG. 1 is a block diagram of an example audio communication system 100 in which embodiments for controlling receive signal processing may be implemented. As shown in FIG. 1, audio communication system 100 includes a near-end telephony device 106 and a far-end telephony device 116. One or more speakers 104 and one or more microphones 108 may be integrated with or communicatively connected to near-end telephony device 106. Likewise, one or more speakers 114 and one or more microphones 118 may be integrated with or communicatively connected to far-end telephony device 116. Audio communication system 100 may also include one or more servers 110. Server(s) 110 may store data and/or perform various operations associated with audio communication system 100 to be described herein. Near-end telephony device 106, far-end telephony device 116, and server(s) 110 may be connected to each other via one or more communication networks 112. Components of audio communication system 100 will now be described.

Near-end telephony device 106 and far-end telephony device 116 may each comprise a device having telephony capability, such as a corded telephone, cordless telephone, cellular telephone, smart phone, desk set, Wi-Fi® telephone, car telephone adapter, personal digital assistant (PDA), or computing device executing a softphone or software application.

Microphone(s) 108 and microphone(s) 118 may each comprise a device capable of capturing audio signals, such as a stand-alone microphone (e.g., boom microphone), a microphone that is part of a device (e.g., headset), or a microphone that is internal to near-end telephony device 106 or far-end telephony device 116. Microphone(s) 108 and microphone(s) 118 may each be integrated with near-end telephony device 106 and far-end telephony device 116, respectively, as internal microphones. Alternatively, microphone(s) 108 and microphone(s) 118 may each be communicatively connected to near-end telephony device 106 and far-end telephony device 116, respectively, via wires/electrical contacts or by wireless connections implemented using wireless technologies (e.g., Bluetooth®, Near Field Communication, and AirPlay®) known in the art.

Speaker(s) 104 and speaker(s) 114 may each comprise a device capable of playing back audio signals, such as a stand-alone loudspeaker, a loudspeaker that is part of a device, or a speaker that is internal to near-end telephony device 106 or far-end telephony device 116. For example, speaker(s) 104 and speaker(s) 114 may each comprise speakers that are designed for use in or near the ear(s) of a user, such as speakers associated with headsets, handsets, headphones, earphones, and earbuds. Speaker(s) 104 and speaker(s) 114 may also include speakers that are not designed for use in or near the ear(s) of a user. These speakers may include, for example, powered loudspeakers that are externally connected to near-telephony device 106 or far-end telephony device 116 or internal speakers used for conducting a telephone call in a "hands-free" mode. Speaker(s) 104 and speaker(s) 114 may each be integrated with near-end telephony device 106 and far-end telephony device 116, respectively, as internal speakers. Alternatively, speaker(s) 104 and speaker(s) 114 may each be communicatively connected to near-end telephony device 106 and far-end telephony device 116, respectively, via wires/electrical contacts or by wireless connections implemented using wireless technologies (e.g., Bluetooth®, Near Field Communication, and AirPlay®) known in the art.

Near-end telephony device 106 operates in a well-known manner to obtain a speech signal representing the voice of a near-end user 102 via microphone(s) 108 and to transmit such speech signal over communication network(s) 112 to far-end telephony device 116. Far-end telephony device 116 operates in a well-known manner to play back the speech signal to a far-end user 120 via speaker(s) 114. Conversely, far-end telephony device 116 operates in a well-known manner to obtain a speech signal representing the voice of far-end user 120 via microphone(s) 118 and to transmit such speech signal over communication network(s) 112 to near-end telephony device 106. Near-end telephony device 106 operates in a well-known manner to play back the speech signal, which may be referred to as a "receive signal," via speaker(s) 104.

The signal processing control techniques described herein are described in connection with speech signals and telephony devices. However, persons skilled in the relevant art(s) will readily appreciate that the techniques described herein can also apply to music signals and audio signals generally. Thus, any reference to a speech or a receive signal is not intended to be limiting. Where the terms "speech signal" or "receive signal" are used, the terms "music signal" and "audio signal" may also be used interchangeably. Moreover, the techniques described herein can also apply to audio devices other than telephony devices, such as televisions and movie playback devices. Thus, any reference to a telephony device is not intended to be limiting. Where the terms "telephony device" are used, the terms "audio device" may also be used interchangeably.

C. Example Embodiment for Controlling Sidetone Generation

Figure 2:
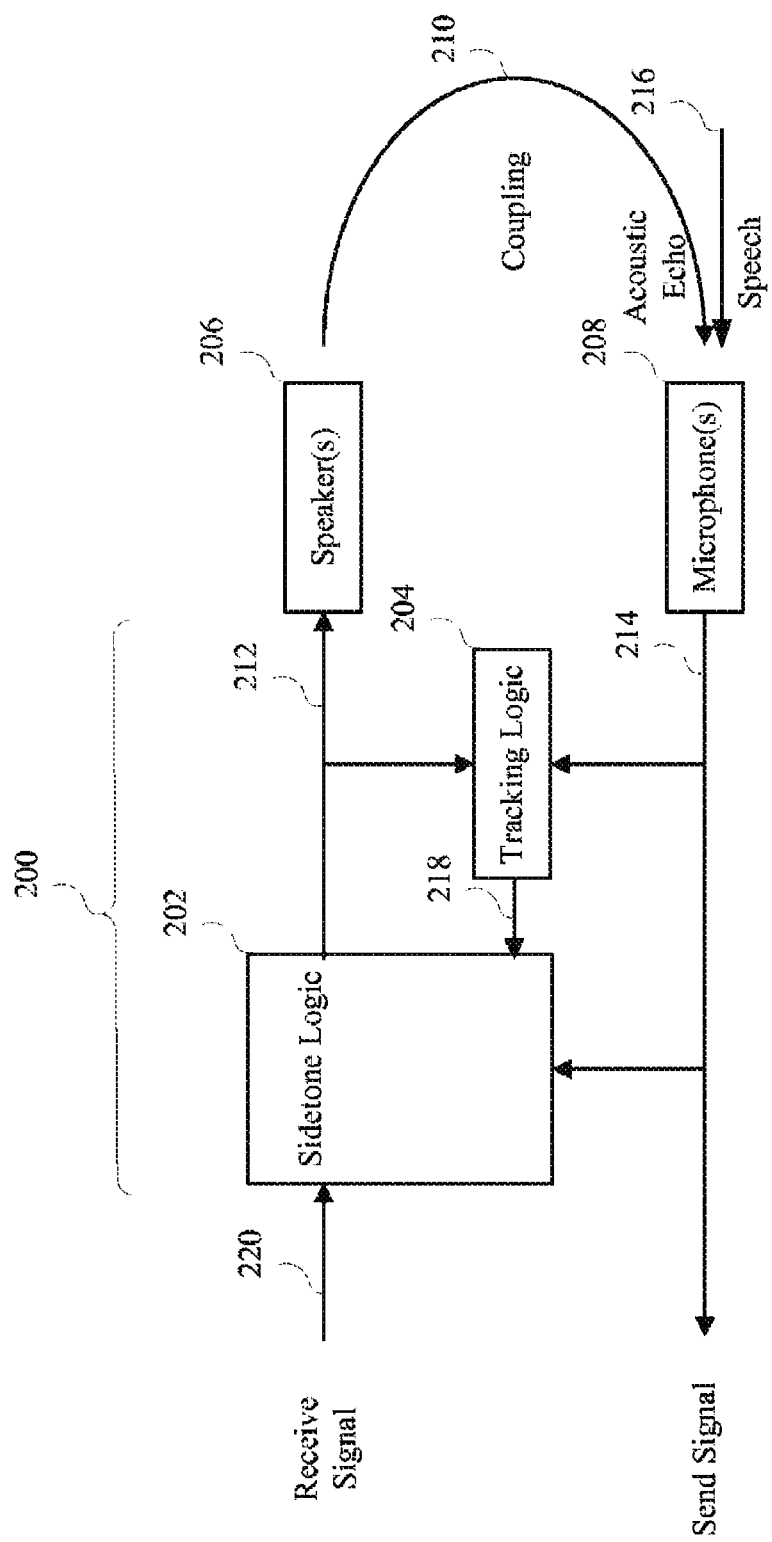
FIG. 2 is a block diagram of a telephony device that controls sidetone generation in accordance with an embodiment.

FIG. 2 is a block diagram of a telephony device 200 that controls sidetone generation in accordance with an embodiment. Telephony device 200 may be an example of near-end telephony device 106 shown in FIG. 1. As shown in FIG. 2, telephony device 200 includes sidetone logic 202 and tracking logic 204. As also shown in FIG. 2, one or more speakers 206 and one or more microphones 208 are integrated with or communicatively connected to telephony device 200.

Sidetone logic 202 comprises logic internal to telephony device 200 that operates to receive and process a speech signal, denoted receive signal 220. Receive signal 220 may be received from a far-end telephony device, such as far-end telephony device 116 shown in FIG. 1, via one or more communication networks, such as communication network(s) 112 shown in FIG. 1. Depending on certain factors to be discussed herein, sidetone logic 202 will either add sidetone to receive signal 220 or not add sidetone to receive signal 220. In either case, sidetone logic 202 outputs a processed receive signal 212, which is passed to speaker(s) 206 for playback thereby. Note that other signal processing elements (not shown in FIG. 2) may apply other types of signal processing techniques to processed receive signal 212 prior to playback by speaker(s) 206, including but not limited to digital to analog conversion.

Speaker(s) 206 may be an example of speaker(s) 104 shown in FIG. 1. Speaker(s) 206 are configured to play back processed receive signal 212. Each speaker(s) 206 may comprise an electroacoustic transducer that operates in a well-known manner to convert an analog representation of an audio signal into sound waves for perception by a user.

Microphone(s) 208 may be an example of microphone(s) 108 shown in FIG. 1. Each microphone(s) 208 may be arranged in a manner such that at least a portion of each microphone(s) 208 is exposed to sound waves emanating from one or more local sound sources. As shown in FIG. 2, such sound waves may comprise speech 216 of a near-end user as well as acoustic echo 210. Acoustic echo 210 represents sound waves generated by speaker(s) 206 and captured by microphone(s) 208. Each microphone(s) 208 may comprise an electroacoustic transducer that operates in a well-known manner to convert captured sound waves into a corresponding audio signal, denoted send signal 214. Generating send signal 214 may further comprise converting an analog signal produced by microphone(s) 208 into a digital form.

Send signal 214 is intended to be transmitted to a far-end telephony device, such as far-end telephony device 116 shown in FIG. 1, via one or more communication networks, such as communication network(s) 112 as shown in FIG. 1. It is noted that send signal 214 may be processed prior to being transmitted to the far-end telephony device. Such processing may include, for example, applying echo cancellation and/or suppression to send signal 214.

Tracking logic 204 comprises logic within telephony device 200 that is configured to receive both processed receive signal 212 and send signal 214 and to determine a measure of coupling 218 based on those signals. Such measure of coupling is indicative of a degree of coupling between speaker(s) 206 and microphone(s) 208. Tracking logic 204 is further configured to output the measure of coupling to sidetone logic 202. Tracking logic 204 may be implemented in hardware, in software executed by a suitable processing unit, or as a combination of hardware and software.

In one embodiment, tracking logic 204 obtains the measure of coupling by calculating an echo return loss (ERL) measure. ERL represents a difference in level between the audio signal played back by speaker(s) 206 and the acoustic echo of that signal as picked up by microphone(s) 208. A high ERL generally corresponds to a low level of coupling between speaker(s) 206 and microphone(s) 208 while a low ERL generally corresponds to a high level of coupling between speaker(s) 206 and microphone(s) 208. An ERL measure is commonly used by echo cancellers and echo suppressors. Thus, in one embodiment, tracking logic 204 may comprise a part of an echo canceller or echo suppressor that is internal to telephony device 200. However, this example is not intended to be limiting, and tracking logic 204 may also exist outside of an echo canceller or echo suppressor or in a telephony device that does not include an echo canceller or echo suppressor.

Sidetone logic 202 is configured to receive measure of coupling 218, send signal 214 and receive signal 220. Based on measure of coupling 218, sidetone logic 202 determines whether sidetone is to be combined with receive signal 220 and/or determines a strength of sidetone to be combined with receive signal 220. If sidetone is added, sidetone logic 202 derives the sidetone from send signal 214. For example, in one embodiment, the sidetone comprises an attenuated version of send signal 214. Sidetone logic 202 may be implemented in hardware, in software executed by a suitable processing unit, or as a combination of hardware and software.

In one embodiment, sidetone logic 202 adds sidetone to receive signal 220 only when the measure of coupling indicates a low degree of coupling between speaker(s) 206 and microphone(s) 208. For example, in an embodiment in which the measure of coupling is an ERL measure, sidetone logic 202 may not add any sidetone to receive signal 220 when the ERL measure is below a certain threshold, which may indicate a high degree of coupling between speaker(s) 206 and microphone(s) 208. Such a high degree of coupling may be present, for example, when telephony device 200 is being operated in a hands-free mode or when speaker(s) 206 comprise one or more external powered speakers. In this case, disabling the addition of sidetone may be desirable so as to avoid acoustic echo and/or acoustic feedback.

In further accordance with this example, sidetone logic 202 may add sidetone to receive signal 220 when the ERL measure is above a certain threshold, which may indicate a low degree of coupling between speaker(s) 206 and microphone(s) 208. Such a low degree of coupling may be present, for example, when telephony device 200 is being operated in a handset mode or when speaker(s) 206 comprise a headset or pair of headphones. In this case, enabling the addition of sidetone may be desirable since there is little risk of acoustic echo and/or acoustic feedback.

In addition to selectively adding or not adding sidetone to receive signal 220, sidetone logic 202 may also be configured to selectively determine the strength of the sidetone that will be added to receive signal 220 based on the measure of coupling. For example, sidetone logic 220 may add a relatively weak sidetone to receive signal 220 if the measure of coupling indicates a high degree of coupling between speaker(s) 206 and microphone(s) 208 and add a relatively strong sidetone to receive signal 220 if the measure of coupling indicates a low degree of coupling between speaker(s) 206 and microphone(s) 208.

In one embodiment, tracking logic 204 is configured to obtain a single measure of coupling (e.g., shortly after a telephone call begins) and sidetone logic 202 is configured to enable or disable sidetone and/or select a sidetone strength based on the single measure of coupling. In an alternate embodiment, tracking logic 204 is configured to obtain a new or updated measure of coupling on a periodic or intermittent basis (e.g., at various times during a telephone call) and sidetone logic 202 is configured to selectively enable/disable sidetone and/or change the strength of the sidetone based on each new measure of coupling received from tracking logic 204. Still other approaches may be used.

The foregoing approach to the control of sidetone generation is advantageous in that it can be achieved without requiring that telephony device 200 be able to determine what type of speaker(s) are being used to play back audio. This may be the case, for example, if speaker(s) 206 comprise external components (e.g., a headset, a pair of headphones, or one or more external powered speakers) that a user has connected to telephony device 200. However, the foregoing approach to controlling sidetone generation is not limited to such scenarios, and can be used even in cases in which telephony device 200 is capable of determining the type of speaker(s) being used to play back audio.

Figure 3:
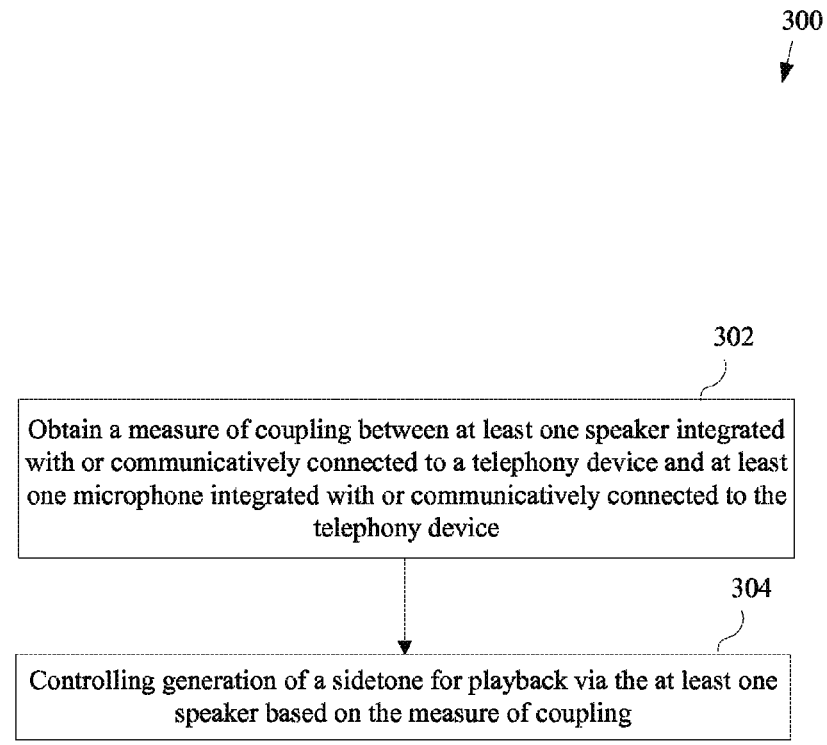
FIG. 3 depicts a flowchart of a method for controlling sidetone generation in accordance with an embodiment.

To further illustrate this approach, FIG. 3 depicts a flowchart 300 of a method for controlling sidetone generation in accordance with an embodiment. The method of flowchart 300 will be described with continued reference to telephony device 200 of FIG. 2 for illustrative purposes. However, the method is not limited to that embodiment. Further structural and operational embodiments will be apparent to persons skilled in the relevant art(s) based on the following description of flowchart 300.

As shown in FIG. 3, flowchart 300 begins at step 302. In step 302, a measure of coupling between at least one speaker integrated with or communicatively connected to a telephony device and at least one microphone integrated with or communicatively connected to the telephony device is obtained. For example, in the embodiment shown in FIG. 2, this step may be performed when tracking logic 204 obtains measure of coupling 218 between speaker(s) 206 and microphone(s) 208. As discussed above, in one embodiment, the obtained measure of coupling may comprise an ERL measure.

At step 304, generation of a sidetone for playback via the at least one speaker is controlled based on the measure of coupling. As discussed above, controlling the generation of sidetone based on the measure of coupling may comprise enabling the addition of sidetone to a receive signal based on the measure of coupling, disabling the addition of sidetone to a receive signal based on the measure of coupling, or selectively determining the strength of sidetone to be added to a receive signal based on the measure of coupling. This step may be performed, for example, by sidetone logic 202 of FIG. 2, which may selectively add or not add sidetone to receive signal 220 based on measure of coupling 218 or add sidetone having a particular strength to receive signal 220 wherein the strength of the sidetone is determined based on measure of coupling 218.

Figure 4:
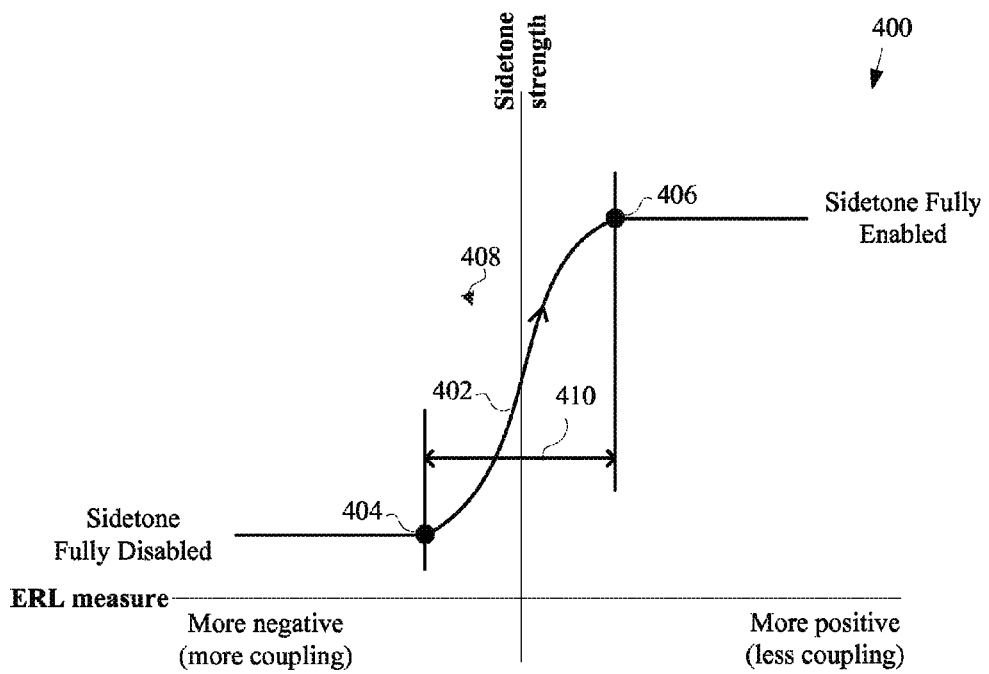
FIGS. 4 and 5 depict graphs that illustrate an example scheme for controlling sidetone generation in accordance with an embodiment.
Figure 5:
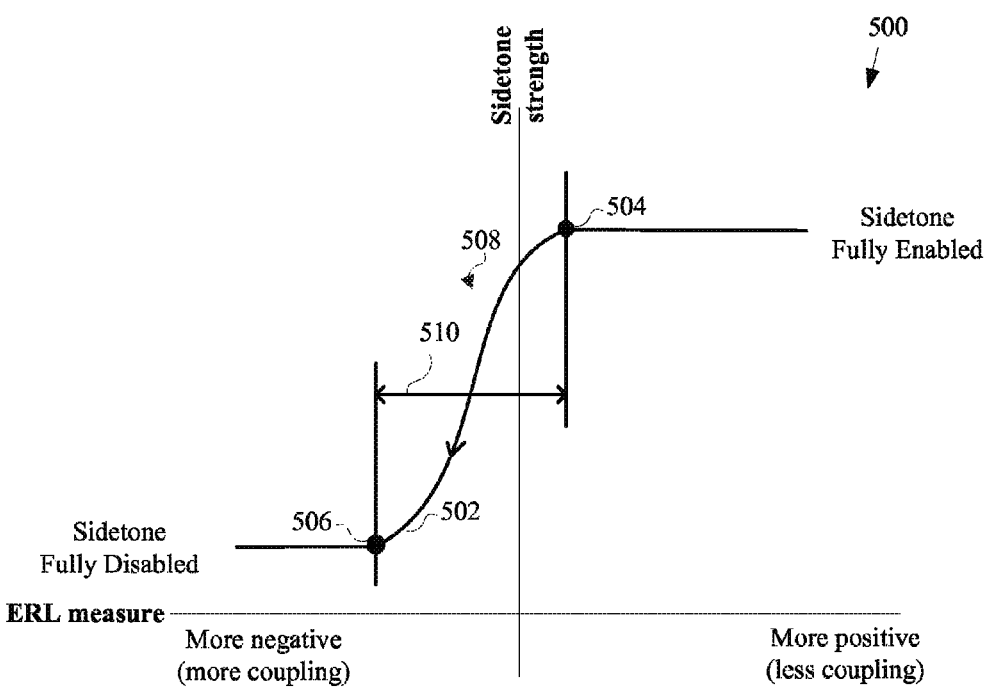

FIGS. 4 and 5 depict graphs 400 and 500, respectively, that illustrate an example scheme for controlling sidetone generation that may be implemented by telephony device 200 in accordance with an embodiment in which ERL is used as the measure of coupling. In particular, graph 400 shows a "sidetone-off-to-on" control scheme that may be utilized when telephony device 200 is currently operating in a sidetone off (disabled) state and graph 500 shows a "sidetone-on-to-off" control scheme that may be utilized when telephony device 200 is currently operating in a sidetone on (enabled) state.

In graph 400, a sidetone curve 402 is shown as including a transition region 408 that separates the extremes of sidetone generation being fully disabled and sidetone generation being fully enabled. Transition region 408 is bounded by a first threshold 404 and a second threshold 406, the combination of which delineates a width 410 of transition region 408. First threshold 404, second threshold 406, and width 410 may vary with implementation and may be adaptively determined. If width 410 of transition region 408 approaches zero in the independent variable, ERL, then the strength of the sidetone may be quantized to discrete values (i.e., on or off, no in between). In this case, controlling the generation of sidetone is limited to fully enabling or fully disabling the generation of the sidetone based on the ERL measure. If width 410 is non-zero, however, sidetone may be partially enabled in transition region 408. In this case, controlling the generation of sidetone may include changing the strength of the sidetone that is added based on the ERL measure. The relationship between sidetone strength and ERL in transition region 408 may or may not be linear. As shown in FIG. 4, transition region 408 may increase monotonically for the sidetone-off-to-on control scheme relative to the strength of the ERL measure/measure of coupling.

In graph 500, sidetone curve 502 is shown as including a transition region 508 that separates the extremes of sidetone generation being fully enabled and sidetone generation being fully disabled. Transition region 508 is bounded by a first threshold 504 and a second threshold 506, the combination of which delineates a width 510 of transition region 508. First threshold 504, second threshold 506, and width 510 may vary with implementation and may be adaptively determined. If width 510 of transition region 508 approaches zero in the independent variable, ERL, then the strength of the sidetone may be quantized to discrete values (i.e., off or on, no in between). In this case, controlling the generation of sidetone is limited to fully enabling or fully disabling the generation of the sidetone based on the ERL measure. If width 510 is non-zero; however, sidetone may be partially disabled in transition region 508. The relationship between sidetone strength and ERL in transition region 508 may or may not be linear. As shown in FIG. 5, transition region 508 may decrease monotonically for the sidetone-on-to-off control scheme relative to the strength of the ERL measure/measure of coupling. While the sidetone curve 402 and sidetone curve 502, respectively shown in graph 400 and graph 500, are similar in shape and size, they may be independent in that each curve may have different transition regions and associated thresholds.

The transition regions and/or the thresholds associated with sidetone curve 402 and sidetone curve 502 respectively shown in graph 400 and graph 500, may be adaptively determined in various manners. For example, the thresholds may be adapted such that excessive switching between sidetone on-off states is avoided. In particular, the adaptation of the thresholds may be determined by an absolute level of ERL, with the most important transition being to turn off sidetone generation when switching from a use case of a headset or a pair of headphones to a use case of a powered speaker. Such adaptation may also be determined partly by a gain applied to send signal 214, a volume applied to processed receive signal 212, and the overall stability of the component (e.g., sidetone logic 202 and/or tracking logic 204) for controlling feedback in telephony device 200. The adaptation may be open-ended and may depend on external device characteristics (e.g., whether wired or wireless speakers or internal or external microphone) and/or measure of coupling, a history thereof, for example.

In embodiments, other measures may be used in lieu of or in addition to the ERL measure to control sidetone generation. Examples of these measures include an echo return loss enhancement (ERLE) measure, a measure of correlation between a first audio signal played back by a speaker and a second audio signal received by a microphone, an echo dispersion measure, and a bass measure. This listing of measures is for illustrative purposes only and is not intended to be exhaustive. Each of these measures may be used independently or in different combinations for controlling sidetone generation. In example embodiments, each of these measures may be determined by tracking logic 204 and provided to sidetone logic 202. ERLE represents the improvement in echo level introduced by an echo canceller. ERLE may be measured by analyzing at least an input signal of a speaker (e.g., processed receive signal 212) and an output of an echo canceller (which may comprise part of telephony device 200, although not shown in FIG. 2). A large ERLE that is detected with a high degree of confidence may indicate that a significant level of coupling was cancelled by the echo canceller, thus sidetone generation should be turned off or the strength of the sidetone should be reduced. As another example, sidetone generation may be turned off or the strength of sidetone reduced when there is insufficient ERLE to control howling from acoustic feedback. As a further example, a low ERLE that is detected may be, by itself, insufficient to definitely indicate the level of coupling/ERL. In such case, the low ERLE level may be used with other measures to determine the level of coupling. Thus, ERLE may be used as measure of coupling, or it may provide useful information when used in combination with other measures, such as ERL.

A measure of correlation refers to the cross-correlation of an audio signal (e.g., processed receive signal 212) played back by a speaker (e.g., speaker(s) 206) and an audio signal (e.g., send signal 214) received by a microphone (e.g., microphone(s) 208). In an embodiment, when the measure of correlation is sensitive to scalar multiplication of processed receive signal 212 and send signal 214, it may be used as a measure of coupling for controlling sidetone generation. For example, when the measure of correlation is high (i.e., processed receive signal 212 and send signal 214 are strongly correlated), the echo may be above the noise level indicating that the level of coupling is high. In this case, sidetone may be turned off or the strength of the sidetone may be decreased. When the measure of correlation is low (i.e., processed receive signal 212 and send signal 214 are not strongly correlated), the echo may be below the noise level indicating that the level of coupling is low. In this case, sidetone may be turned on or the strength of the sidetone may be increased. When the measure of correlation is insensitive to scalar multiplication of processed receive signal 212 and send signal 214), then the measure of correlation may be less effective as a measure of coupling.

An echo dispersion measure may be representative of the time it takes for an echo path to decay to a negligible level. The echo dispersion measure may be determined as the time it takes an impulse response of an echo to decay to a certain number of decibels (dB) below a peak level or as a particular number of dB below the peak level after a given amount of time. A high echo dispersion measure (e.g., high dispersal time) may mean a high level of echo, and a low echo dispersion measure (e.g., low dispersal time) may mean a low level of echo. Thus, a high echo dispersion measure may correspond to a high level of coupling between a speaker and a microphone, and a low echo dispersion measure may correspond to a low level of coupling between the speaker and the microphone. As such, the dispersion measure may be used to control sidetone generation by turning on or increasing the strength of sidetone when the echo dispersion measure is low, and turning off or decreasing the strength of sidetone when the echo dispersion measure is high.

In an embodiment, ERL may be obtained and further examined to obtain a bass measure for the purposes of controlling sidetone generation. The bass measure may represent a ratio of low-frequency ERL versus total ERL in the frequency domain. Thus, a high bass measure corresponds to high ERL in a low frequency relative to the ERL across all frequencies of an audio signal (e.g., send signal 214). The high bass measure may mean that external powered speakers are being used because external powered speakers typically produce better bass than a headset or a pair of headphones. In this case, sidetone generation may be turned off or the strength of the sidetone reduced. A low bass measure may indicate the presence of a headset or a pair of headphones. In this case, sidetone generation may be turned on or the strength of sidetone increased.

Referring back to telephony device 200 shown in FIG. 2 and flowchart 300 shown in FIG. 3, the functions of obtaining a measure of coupling and controlling sidetone generation based thereon are performed by components (e.g., tracking logic 204, sidetone logic 202) that are internal to telephony device 200. However, in an alternate embodiment, one or more of these functions may be performed by one or more external devices, such as server(s) 110 shown in FIG. 1.

Figure 6:
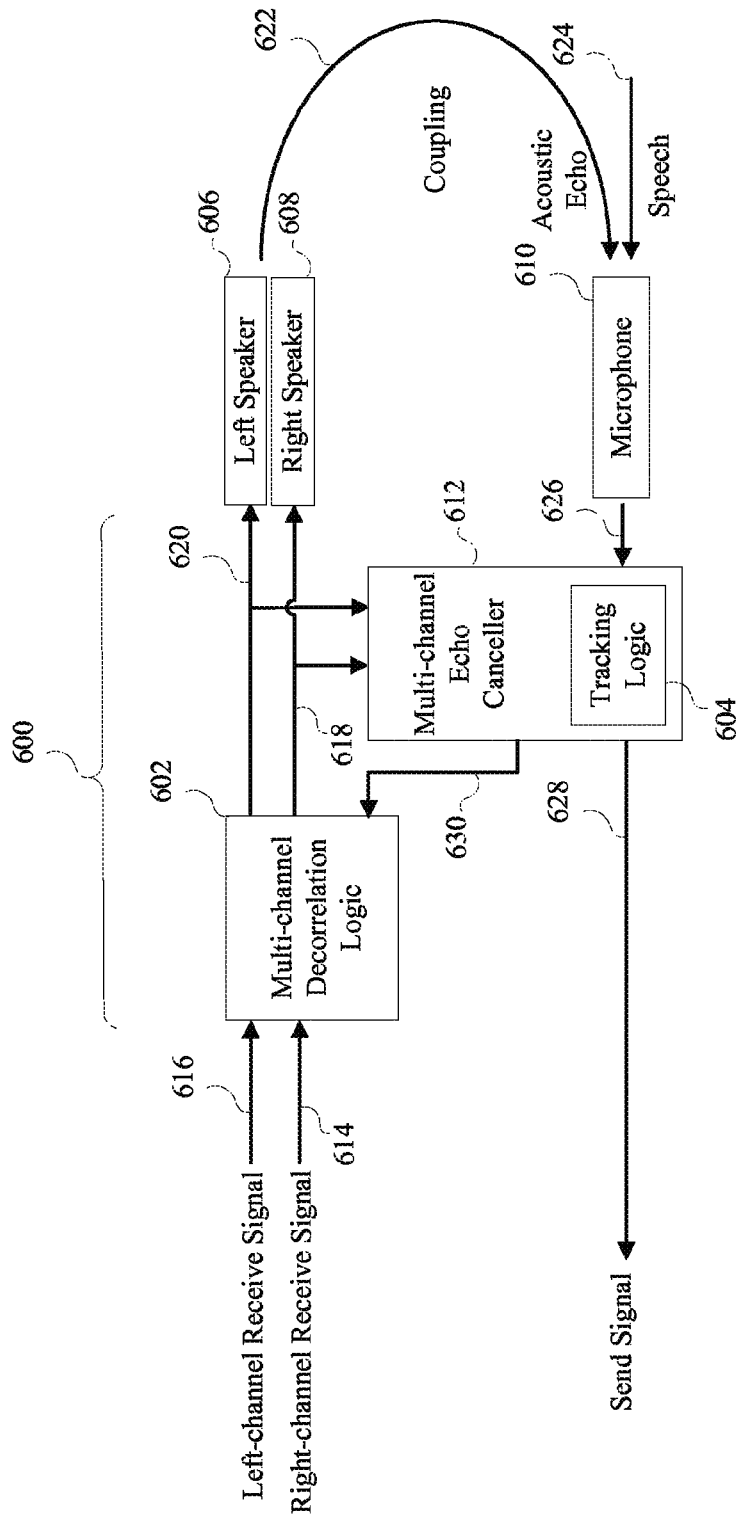
FIG. 6 is a block diagram of an audio device that controls application of multi-channel decorrelation to a multi-channel audio signal in accordance with an embodiment.

D. Example Embodiment for Controlling Application of Multi-Channel Decorrelation to a Multi-Channel Audio Signal FIG. 6 is a block diagram of an audio device 600 that utilizes a measure of coupling to determine whether or not multi-channel decorrelation should be applied to a multi-channel audio signal and/or to determine the degree of multi-channel decorrelation to be applied to the multi-channel audio signal in accordance with an embodiment. Audio device 600 may be an example of near-end telephony device 106 shown in FIG. 1 or any other audio/media playback device (e.g., a television). As shown in FIG. 6, audio device 600 comprises multi-channel decorrelation logic 602 and a multi-channel echo canceller 612 that includes tracking logic 604. As further shown in FIG. 6, a left speaker 606, a right speaker 608, and a microphone 610 are integrated with or communicatively connected to audio device 600. While only two speakers and one microphone are shown in FIG. 6, more may be present.

Multi-channel decorrelation logic 602 comprises logic internal to audio device 600 that operates to receive and process a speech signal. The speech signal may be received from a far-end telephony device, such as far-end telephony device 116 shown in FIG. 1. In the embodiment of FIG. 6, the speech signal may comprise a multi-channel receive signal that includes a left-channel receive signal 616 and a right-channel receive signal 614. Depending on certain factors to be discussed herein, multi-channel decorrelation logic 602 will either apply multi-channel decorrelation to left-channel receive signal 616 and/or right-channel receive signal 614 or not apply multi-channel decorrelation to left-channel receive signal 616 and/or right-channel receive signal 614. In the embodiment of FIG. 6, multi-channel decorrelation logic 602 outputs a processed left-channel receive signal 620 and a processed right-channel receive signal 618, which are respectively passed to left speaker 606 and right speaker 608 for playback thereby. Note that other signal processing elements (not shown in FIG. 6) may apply other types of signal processing techniques to processed left-channel receive signal 620 and processed right-channel receive signal 618 prior to playback by left speaker 606 and right speaker 608, including but not limited to digital to analog conversion.

Left speaker 606 and right speaker 608 may be examples of speaker(s) 104 shown in FIG. 1. Left speaker 606 and right speaker 608 are configured to play back processed left-channel receive signal 620 and processed right-channel receive signal 618, respectively. Left speaker 606 and right speaker 608 may each comprise an electroacoustic transducer that operates in a well-known manner to convert an analog representation of an audio signal into sound waves for perception by a user.

Microphone 610 may be an example of microphone(s) 108 shown in FIG. 1. Microphone 610 may be exposed to sound waves emanating from one or more local sound sources. As shown in FIG. 6, such sound waves may comprise speech 624 of a near-end user as well as acoustic echo 622. Microphone 610 is configured to capture speech 624 and acoustic echo 622 and output them as microphone signal 626. Microphone 610 may comprise an electroacoustic transducer that operates in a well-known manner to convert captured sound waves into microphone signal 626. Generating microphone signal 626 may further comprise converting an analog signal produced by microphone 610 into a digital form.

Multi-channel echo canceller 612 operates to receive processed right-channel receive signal 618, processed left-channel receive signal 620, and microphone signal 626 and to cancel echo (e.g., acoustic echo 622) by modeling and cancelling the echo on each channel. In order to successfully perform echo cancellation, multi-channel echo canceller 612 must determine the echo component that is attributable to left speaker 606 and the echo component that is attributable to right speaker 608. It may be more difficult for multi-channel echo canceller 612 to perform echo cancellation when processed right-channel receive signal 618 and processed left-channel receive signal 620 are highly correlated. To aid multi-channel echo canceller 612 in this regard, multi-channel decorrelation may be applied to left-channel receive signal 616 and/or to right-channel receive signal 614 to reduce the degree of correlation between them. Multi-channel echo canceller 612 outputs a measure of coupling 630, which may be used in controlling the application of multi-channel decorrelation to left-channel receive signal 616 and/or right-channel receive signal 614. In addition, multi-channel echo canceller 612 outputs an echo-cancelled microphone signal, denoted as send signal 628, for transmission to a far-end telephony device. Multi-channel echo canceller 612 may be implemented in hardware, in software executed by a suitable processing unit, or as a combination of hardware and software.

Tracking logic 604 comprises logic within audio device 600 that is configured to determine a measure of coupling 630 based on one or more of processed right-channel receive signal 618 and processed left-channel receive signal 620 and microphone signal 626. Such measure of coupling is indicative of a degree of coupling between one or more of left speaker 606 and right speaker 608 and microphone 610. In one embodiment, tracking logic 604 obtains the measure of coupling in a similar manner as described in connection with tracking logic 204 shown in FIG. 2. For example, tracking logic 604 may obtain an ERL measure, an ERLE measure, a measure of correlation between a first audio signal played back by a speaker and a second audio signal received by a microphone, an echo dispersion measure, and/or a bass measure, individually or in combination. In the embodiment of FIG. 6, tracking logic 604 is a part of multi-channel echo canceller 612, although tracking logic 604 may be a part of an echo suppressor or may exist outside of either in other embodiments. Tracking logic 604 may be implemented in hardware, in software executed by a suitable processing unit, or as a combination of hardware and software.

Multi-channel decorrelation logic 602 operates to receive measure of coupling 630, left-channel receive signal 616 and right-channel receive signal 614. Based on measure of coupling 630, multi-channel decorrelation logic 602 determines whether to apply multi-channel decorrelation to left-channel receive signal 616 and/or right-channel receive signal 614. The application of multi-channel decorrelation may comprise introducing a distortion to left-channel receive signal 616 and/or right-channel receive signal 614 such that multi-channel echo canceller 612 may better distinguish between the two when processing them. For example, multi-channel decorrelation logic 602 may add non-linearities in the subband/frequency domain (e.g., noise) that is recognizable by multi-channel echo canceller 612, yet not recognizable to a user because the non-linearities are below the perceptual threshold of the user. In further accordance with this example, multi-channel decorrelation logic may add a first signal to left-channel receive signal 616 to generate processed left-channel receive signal 620, and add a second signal to right-channel receive signal 614 to generate processed right-channel receive signal 618. The first and the second signal that are added to left-channel receive signal 616 and right-channel receive signal 614 may be uncorrelated (e.g., positive and negative half-wave rectification of left-channel receive signal 616 and right-channel receive signal 614).

In one embodiment, multi-channel decorrelation logic 602 applies multi-channel decorrelation only when the measure of coupling indicates a high degree of coupling between one or more of left speaker 606 and right speaker 608 and microphone 610. For example, in an embodiment in which the measure of coupling is an ERL measure, multi-channel decorrelation logic 602 may apply multi-channel decorrelation when the ERL measure is below a certain threshold, which may indicate a high degree of coupling between one or more of left speaker 606 and right speaker 608 and microphone 610. Such a high degree of coupling may be present, for example, when audio device 600 is being operated in a hands-free mode or when left speaker 606 and right speaker 608 comprise one or more external powered speakers. In this case, application of multi-channel decorrelation to left-channel receive signal 616 and/or right-channel receive signal 614 may be desirable due to the possibility of acoustic echo that may need to be cancelled by multi-channel echo canceller 612.

In further accordance with this example, multi-channel decorrelation logic 602 may not apply multi-channel decorrelation to left-channel receive signal 616 and/or right-channel receive signal 614 when the ERL measure is above a certain threshold, which may indicate a low degree of coupling between one or more of left speaker 606 and right speaker 608 and one or more of microphone 610 and microphone 612. Such a low degree of coupling may be present, for example, when audio device 600 is being operated in a handset mode or when left speaker 606 and right speaker 608 comprise a headset or a pair of headphones. In this case, application of multi-channel decorrelation (e.g., adding non-linearities) to left-channel receive signal 616 and/or right-channel receive signal 614 may not be desirable because the level of echo is negligible and no echo cancellation is needed. Thus, there may be no reason to expend resources to apply the technique or intentionally introduce a distortion to left-channel receive signal 616 or right-channel receive signal 614. Moreover, distortions introduced in this case may be more perceptually noticeable by a user than if external powered loudspeakers are used.

In addition to selectively enabling or disabling application of multi-channel decorrelation to left-channel receive signal 616 and/or right-channel receive signal 614, multi-channel decorrelation logic 602 may also be configured to selectively determine the strength of distortion applied based on the measure of coupling. For example, multi-channel decorrelation logic 602 may introduce a decreasing level of distortion (e.g., less non-linearities) to left-channel receive signal 616 and/or right receive signal 614 in response to a decreasing level of coupling as indicated by the measure of coupling between one or more of left speaker 606 and right speaker 608 and microphone 610. In further accordance with this example, multi-channel decorrelation logic 602 may introduce an increasing level of distortion (e.g., more non-linearities) to left-channel receive signal 616 and/or right-channel receive signal 614 in response to an increasing level of coupling as indicated by the measure of coupling between one or more of left speaker 606 and right speaker 608 and microphone 610.

In one embodiment, tracking logic 604 is configured to obtain a single measure of coupling (e.g., shortly after a telephone call begins) and multi-channel decorrelation logic 602 is configured to enable or disable application of multi-channel decorrelation to left-channel receive signal 616 and/or right-channel receive signal 614 and/or select a distortion level based on the single measure of coupling. In an alternate embodiment, tracking logic 604 is configured to obtain a new or updated measure of coupling on a periodic or intermittent basis (e.g., at various times during a telephone call) and multi-channel decorrelation logic 602 is configured to selectively enable or disable application of multi-channel decorrelation to left-channel receive signal 616 and/or right-channel receive signal 614 and/or select a distortion level based on each new measure of coupling received from tracking logic 604. Still other approaches may be used.

The foregoing approach to the control of application of multi-channel decorrelation to a multi-channel receive signal is advantageous in that it can be achieved without requiring that audio device 600 be able to determine what type of speakers are being used to play back audio. This may be the case, for example, if left speaker 606 and right speaker 608 comprise external devices (e.g., a headset, a pair of headphones, or external powered speakers) that a user has connected to audio device 600. However, the foregoing approach to controlling application of multi-channel decorrelation to the receive signal is not limited to such scenarios and can be used even in cases in which audio device 600 is capable of determining the type of speakers being used to play back audio.

Figure 7:
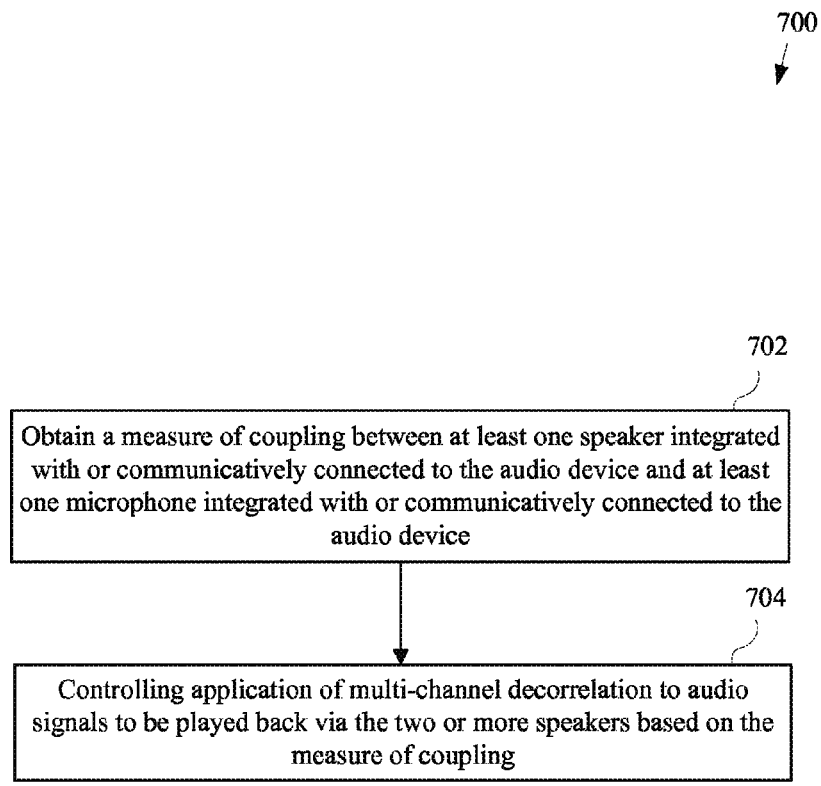
FIG. 7 depicts a flowchart of a method for controlling application of multi-channel decorrelation to a multi-channel audio signal in accordance with an embodiment.

To further illustrate this approach, FIG. 7 depicts a flowchart 700 of a method for controlling application of multi-channel decorrelation to audio signals to be played back via two or more speakers in accordance with an embodiment. The method of flowchart 700 will be described with continued reference to audio device 600 of FIG. 6 for illustrative purposes. However, the method is not limited to that embodiment. Further structural and operational embodiments will be apparent to persons skilled in the relevant art(s) based on the following description of flowchart 700.

As shown in FIG. 7, flowchart 700 begins at step 702. In step 702, a measure of coupling between at least one speaker integrated with or communicatively connected to an audio device and at least one microphone integrated with or communicatively connected to the audio device is obtained. For example, in the embodiment shown in FIG. 6, this step may be performed when tracking logic 604 obtains measure of coupling 630 between one or more of left speaker 606 and right speaker 608 and microphone 610. As discussed above, in one embodiment, the obtained measure of coupling may comprise an ERL measure. Additionally or alternatively, other measures may also be obtained in the manner described above in section C, such as an ERLE measure, a measure of correlation between a first audio signal played back by a speaker and a second audio signal received by a microphone, an echo dispersion measure, and a bass measure.

At step 704, application of multi-channel decorrelation to audio signals to be played back via the two or more speakers is controlled based on the measure of coupling. As discussed above, controlling the application of multi-channel decorrelation to audio signals to be played back via the two or more speakers based on the measure of coupling may comprise enabling the application of multi-channel decorrelation to an audio signal based on the measure of coupling, disabling the application of multi-channel decorrelation to a receive signal based on the measure of coupling, or selectively changing a degree to which multi-channel decorrelation is applied (e.g., determining the extent to which non-linearities is added) to an audio signal based on the measure of coupling. This step may be performed, for example, by multi-channel decorrelation logic 602 of FIG. 6, which may selectively apply or not apply multi-channel decorrelation to left-channel receive signal 616 and/or right-channel receive signal 614 based on measure of coupling 630 or apply a distortion having a particular strength to left-channel receive signal 616 and/or right-channel receive signal 614 wherein the strength of the distortion is determined based on measure of coupling 630. The amount of distortion introduced to left-channel receive signal 616 and right-channel receive signal 614 could be managed in an analogous manner to that discussed above in FIGS. 4 and 5 when the measure of coupling is an ERL measure.

Referring back to audio device 600 shown in FIG. 6, the functions of obtaining a measure of coupling and controlling application of multi-channel decorrelation to audio signals based thereon are performed by components (e.g., tracking logic 604, multi-channel echo canceller 612, multi-channel decorrelation logic 602,) that are internal to audio device 600. However, in an alternate embodiment, one or more of these functions may be performed by one or more external devices, such as server(s) 110 shown in FIG. 1.

E. Example Embodiment for Controlling Audio Signal Processing

Figure 8:
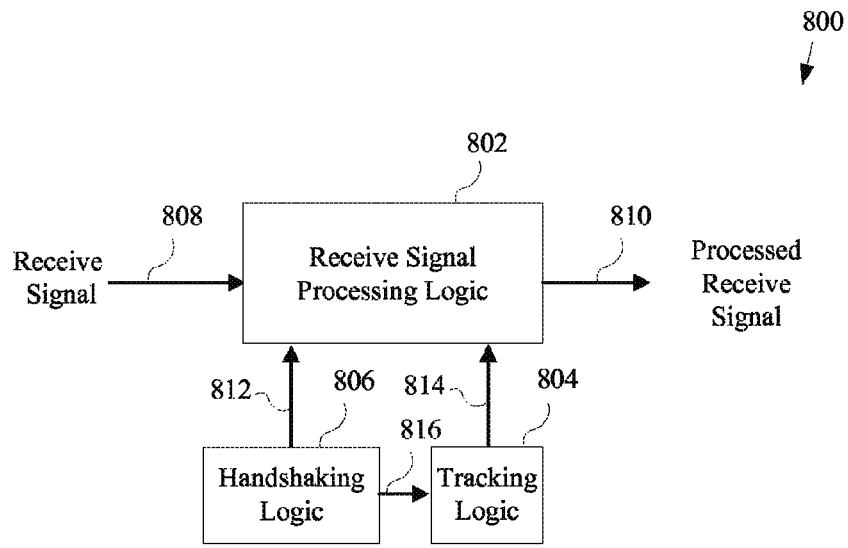
FIG. 8 is a block diagram of an audio device that controls audio signal processing in accordance with an embodiment.

FIG. 8 is a block diagram of an audio device 800 that controls receive signal processing using product information about one or more audio playback devices or using a measure of coupling between one or more speakers associated with one or more audio playback devices and one or more microphones. Audio device 800 may be an example of near-end telephony device 106 shown in FIG. 1 or any other audio/media playback devices (e.g., music playback device). As shown in FIG. 8, audio device 800 comprises receive signal processing logic 802, tracking logic 804, and handshaking logic 806. While not shown in FIG. 8, it is to be understood that audio device 800 is communicatively connected (e.g., via wired or wireless connection(s)) with one or more audio playback devices comprising one or more speakers, such as speaker(s) 104, and a microphone, such as microphone(s) 108 shown in FIG. 1.

Receive signal processing logic 802 operates to receive product information 812 from handshaking logic 806 or a measure of coupling 814 from tracking logic 804 to control receive signal processing and to output processed receive signal 810. In one embodiment, receive signal processing logic 802 is configured to control receive signal processing, such as controlling sidetone generation or controlling application of multi-channel decorrelation to an audio signal to be played back by an audio playback device, based on product information 812. If product information 812 is not available, receive signal processing logic 802 may control receive signal processing based on measure of coupling 814.

In accordance with an embodiment, if product information 812 indicates that the audio playback device(s) connected to audio device 800 comprises a headset or a pair of headphones then sidetone may be added to receive signal 808 or the degree to which sidetone is generated may be increased. Additionally or alternatively, application of multi-channel decorrelation to receive signal 808, which may be a multi-channel receive signal, may be disabled or the degree to which multi-channel decorrelation is applied to receive signal 808 may be decreased. In further accordance with this embodiment, if product information 812 indicates that the audio playback device(s) comprises one or more external powered speakers then sidetone may not be added to receive signal 808 or the degree to which sidetone is generated may be decreased. Additionally or alternatively, application of multi-channel decorrelation to receive signal 808 may be enabled or the degree to which multi-channel decorrelation is applied may be increased.

In further accordance with the embodiment, when product information is not available, receive signal processing logic 802 may control sidetone generation based on measure of coupling 814 in an analogous manner to that discussed above in connection with sidetone logic 202 depicted in FIG. 2. For example, when measure of coupling 814 indicates a low degree of coupling between one or more speakers associated with the audio playback device(s) and the microphone(s) connected to audio device 800, receive signal processing logic 802 may enable sidetone generation. Moreover, when measure of coupling 814 indicates a high degree of coupling, receive signal processing logic 802 may disable sidetone generation. Receive signal processing logic 802 may further selectively determine the strength of sidetone that will be added to receive signal 808 based on measure of coupling 814.

Receive signal processing logic 802 may also control application of multi-channel decorrelation to receive signal 808 based on measure of coupling 814 in an analogous manner to that discussed above in connection with multi-channel decorrelation logic 602 shown in FIG. 6. For example, when measure of coupling 814 indicates a low degree of coupling between one or more speakers associated with the audio playback device(s) and microphone(s) communicatively connected to audio device 800, receive signal process logic 802 may disable application of multi-channel decorrelation to receive signal 808. Moreover, when measure of coupling 814 indicates a high degree of coupling, receive signal processing logic 802 may enable application of multi-channel decorrelation to receive signal 808. Receive signal processing logic 802 may further selectively determine the degree to which multi-channel decorrelation is applied to receive signal 808 based on measure of coupling 814.

Handshaking logic 806 operates to receive one or more messages from the audio playback device(s) that is communicatively connected to audio device 800. The one or more messages may be received via a channel that is established for transmitting audio to the audio playback device(s) or via a separate channel. Such messages may contain product information that indicates a product type of the audio playback device(s) (e.g., a headset or a pair of headphones or an external powered speaker) or a product identifier, which may be used to obtain the product type via a lookup table or any other means (e.g., database, software application, web search engines). Thus, handshaking logic 806 is configured to determine whether product information is extractable (e.g., contained in the one or more messages), and if available, extract and output the product information as product information 812 to receive signal processing logic 802. If such product information is not available or otherwise not extractable then handshaking logic 806 generates and outputs an indication 816 to tracking logic 804 indicating that product information is not extractable. Handshaking logic 806 may be implemented in hardware, in software executed by a suitable processing unit, or as a combination of hardware and software.

Tracking logic 804 is configured to receive indication 816 and operates to determine a measure of coupling between one or more speakers associated with the audio playback device(s) and the microphones that are communicatively connected to telephony 800. In an embodiment, tracking logic 804 determines a measure of coupling in response to receiving indication 816 from handshaking logic 806 indicating that product information regarding the one or more audio playback devices is not extractable. Tracking logic 804 is configured to output measure of coupling 814 to receive signal processing logic 802. Tracking logic 804 may obtain a measure of coupling in an analogous manner to that discussed above in connection with tracking logic 204 shown in FIG. 2. For example, tracking logic 804 may obtain an ERL measure, an ERLE measure, a measure of correlation between a first audio signal played back by a speaker and a second audio signal received by a microphone, an echo dispersion measure, and a bass measure. Tracking logic 804 may be implemented in hardware, in software executed by a suitable processing unit, or as a combination of hardware and software.

Figure 9:
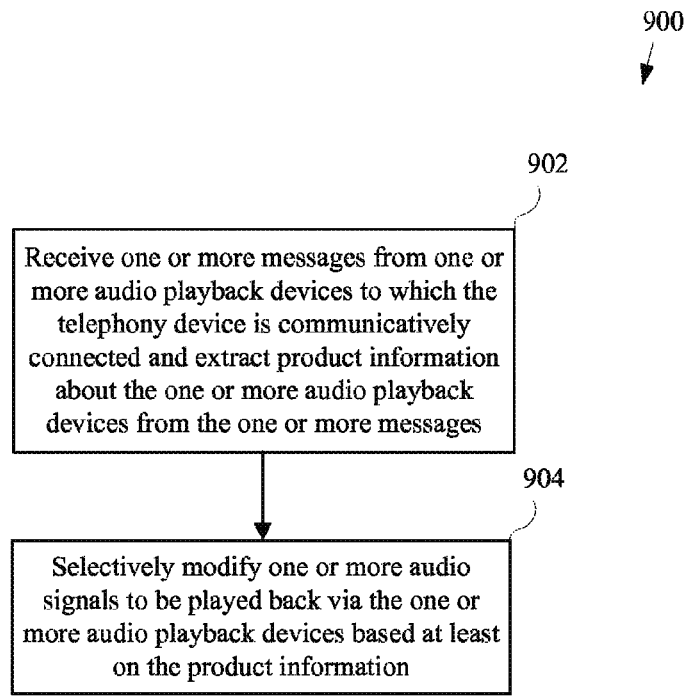
FIG. 9 shows a flowchart of a method for controlling audio signal processing in accordance with an embodiment.

To further illustrate this approach, FIG. 9 depicts a flowchart 900 of a method for controlling receive signal processing in accordance with an embodiment. The method of flowchart 900 will be described in continued reference to audio device 800 of FIG. 8 for illustrative purposes. However, the method is not limited to that embodiment. Further structural and operational embodiments will be apparent to persons skilled in the relevant art(s) based on the following description of flowchart 900.

As shown in FIG. 9, flowchart 900 begins at step 902. In step 902, one or more messages from one or more audio playback devices to which the telephony device is communicatively connected are received and product information about the one or more audio playback devices is extracted from the one or more messages. For example, in the embodiment shown in FIG. 8, this step may be performed when handshaking logic 806 receives one or more messages from the audio playback device(s) connected to audio device 800. Moreover, handshaking logic 806 may extract product information about the audio playback device(s) from the one or more messages. As discussed above, the product information may indicate a product type or a product identifier from which a product type may be determined.

At step 904, one or more audio signals to be played back via the one or more playback devices is selectively modified based at least one the product information. As discussed above, selectively modifying one or more audio signals to be played back via the one or more playback devices comprises enabling or disabling the addition of sidetone to receive signal 808 or changing the strength of sidetone that is added to receive signal 808 based at least on product information 812. In addition, selectively modifying one or more audio signals also comprises enabling or disabling the application of multi-channel decorrelation to receive signal 808 or changing a level of distortion that is introduced to receive signal 808 based on product information 812.

Referring back to audio device 800 shown in FIG. 8 and flowchart 900 shown in FIG. 9, the functions of receiving one or more messages, extracting product information from the one or more messages, and selectively modifying one or more audio signals based on the product information are performed by components (e.g., receiving signal processing logic 802, handshaking logic 806, tracking logic 804) that are internal to audio device 800. However, in an alternate embodiment, one or more of these functions may be performed by one or more external devices, such as server(s) 110 shown in FIG. 1.

F. Example Computing System Implementation

Figure 10:
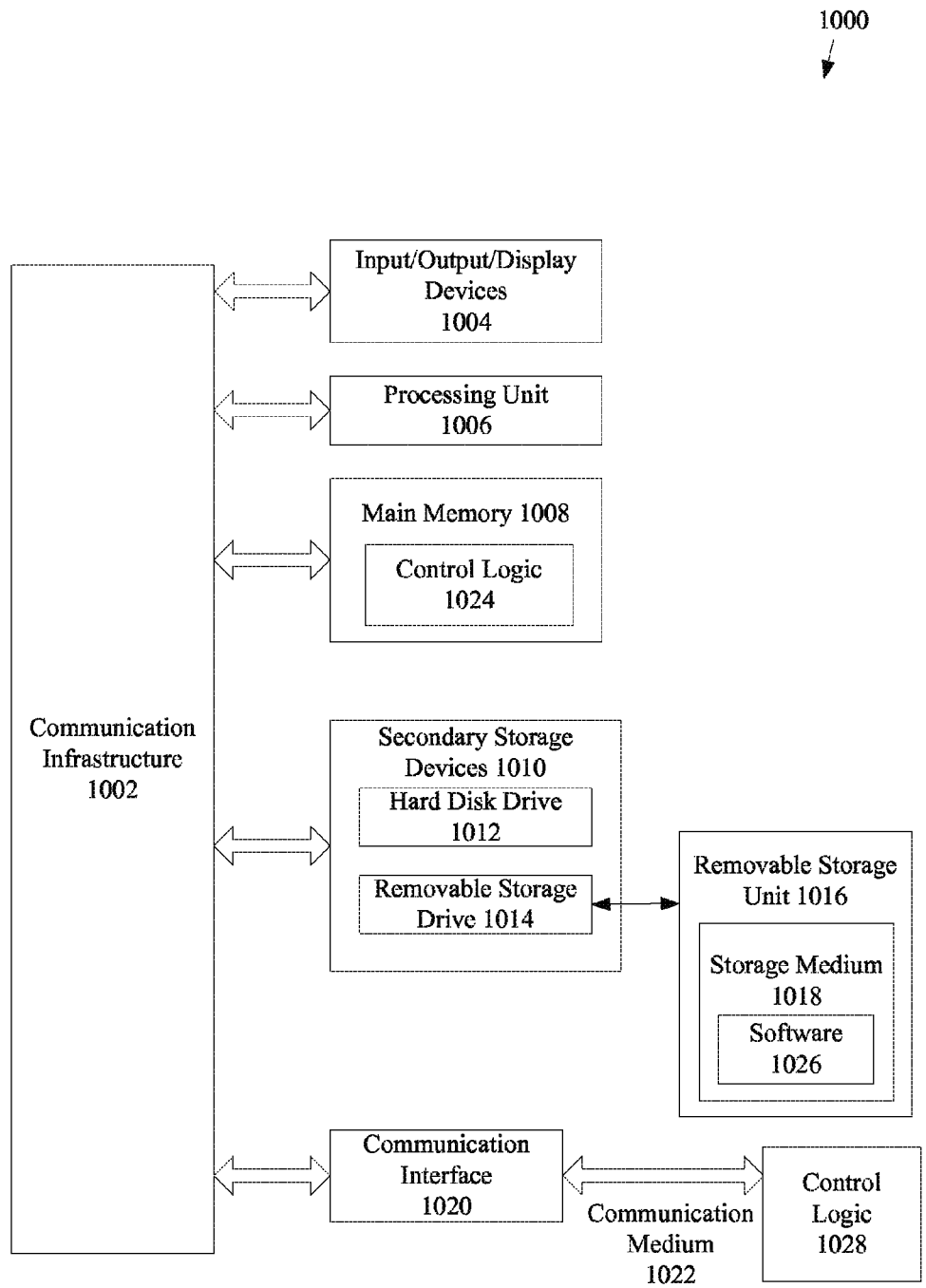
FIG. 10 is a block diagram of an example computing system that may be used to implement various embodiments.

The embodiments described herein, including systems, methods/processes, and/or apparatus, may be implemented using well known computing devices, such as computer 1000 shown in FIG. 10. For example, elements of telephony device 200 including sidetone logic 202 and tracking logic 204; elements of audio device 600 including multi-channel decorrelation logic 602, tracking logic 604, and multi-channel echo canceller 612; elements of audio device 800 including receive signal processing logic 802, tracking logic 804, and handshaking logic 806; each of the steps of flowchart 300 depicted in FIG. 3; each of the steps of flowchart 700 depicted in FIG. 7; and each of the steps of flowchart 900 depicted in FIG. 900 can each be implemented using one or more computers 1000.

As shown in FIG. 10, computer 1000 includes a processing unit 1006. Processing unit 1006 may comprise one or more processors (also called central processing units or CPUs) or processor cores. Processing unit 1006 is connected to a communication infrastructure 1002, such as a communication bus. Computer 1000 also includes a primary or main memory 1008, such as random access memory (RAM). Main memory 1008 has stored therein control logic 1024 (computer software), and data.

Computer 1000 also includes one or more secondary storage devices 1010. Secondary storage devices 1010 include, for example, a hard disk drive 1012 and/or a removable storage device or drive 1014, as well as other types of storage devices, such as memory cards and memory sticks. For instance, computer 1000 may include an industry standard interface, such as a universal serial bus (USB) interface for interfacing with devices such as a memory stick. Removable storage drive 1014 represents a floppy disk drive, a magnetic tape drive, a compact disk drive, an optical storage device, tape backup, etc.

Removable storage drive 1014 interacts with a removable storage unit 1016. Removable storage unit 1016 includes a computer useable or readable storage medium 1018 having stored therein computer software 1026 (control logic) and/or data. Removable storage unit 1216 represents a floppy disk, magnetic tape, compact disc (CD), digital versatile disc (DVD), Blu-ray disc, optical storage disk, memory stick, memory card, or any other computer data storage device. Removable storage drive 1014 reads from and/or writes to removable storage unit 1016 in a well-known manner.

Computer 1000 also includes input/output/display devices 1004, such as monitors, keyboards, pointing devices, etc.

Computer 1000 further includes a communication or network interface 1020. Communication interface 1020 enables computer 1000 to communicate with remote devices. For example, communication interface 1020 allows computer 1000 to communicate over communication networks or mediums 1022 (representing a form of a computer useable or readable medium), such as local area networks (LANs), wide area networks (WANs), the Internet, etc. Network interface 1020 may interface with remote sites or networks via wired or wireless connections. Examples of communication interface 1022 include but are not limited to a modem (e.g., for 3G and/or 4G communication(s)), a network interface card (e.g., an Ethernet card for Wi-Fi and/or other protocols), a communication port, a Personal Computer Memory Card International Association (PCM-CIA) card, a wired or wireless USB port, etc.

Control logic 1028 may be transmitted to and from computer 1000 via the communication medium 1022.

Any apparatus or manufacture comprising a computer useable or readable medium having control logic (software) stored therein is referred to herein as a computer program product or program storage device. This includes, but is not limited to, computer 1000, main memory 1008, secondary storage devices 1010, and removable storage unit 1016. Such computer program products, having control logic stored therein, may be executed by processing unit 1006 to perform methods described herein. For example, such computer program products, when executed by processing unit 1006, may cause processing unit 1006 to perform any of the steps of flowchart 300 of FIG. 3, flowchart 700 of FIG. 7, and flowchart 900 of FIG. 9.

The disclosed technologies may be embodied in software, hardware, and/or firmware implementations other than those described herein. Any software, hardware, and firmware implementations suitable for performing the functions described herein can be used.

G. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for controlling sidetone generation in a telephony device, comprising:
obtaining a measure of coupling between at least one speaker integrated with or communicatively connected to the telephony device and at least one microphone integrated with or communicatively connected to the telephony device, the obtaining comprising obtaining at least one of: an echo return loss (ERL) measure, a measure of correlation between a first audio signal played back by the at least one speaker and a second audio signal received by the at least one microphone, an echo return loss enhancement (ERLE) measure, or an echo dispersion measure; and
controlling generation of a sidetone for playback via the at least one speaker based on the measure of coupling.

2. The method of claim 1, wherein obtaining the ERL measure comprises obtaining the ERL measure from an echo canceller or an echo suppressor.

3. The method of claim 1, wherein controlling generation of a sidetone comprises enabling or disabling the generation of the sidetone based on the measure of coupling.

4. The method of claim 1, wherein controlling generation of a sidetone comprises changing a degree to which the sidetone is generated based on the measure of coupling.

5. The method of claim 1, wherein controlling generation of a sidetone comprises controlling the generation of the sidetone during an active telephone call.

6. The method of claim 1, wherein the method is performed by the telephony device or a server that is connected to the telephony device via a network.

7. The method of claim 1, wherein obtaining the measure of coupling further comprises:
obtaining a bass measure based on at least the ERL measure.

8. A method for controlling multi-channel decorrelation in an audio device, comprising:
obtaining a measure of coupling between one or more speakers integrated with or communicatively connected to the audio device and at least one microphone integrated with or communicatively connected to the audio device; and
controlling application of multi-channel decorrelation to audio signals to be played back via the one or more speakers based on the measure of coupling.

9. The method of claim 8, wherein obtaining the measure of coupling comprises obtaining an echo return loss (ERL) measure.

10. The method of claim 9, wherein obtaining the measure of coupling comprises obtaining the ERL measure from an echo canceller or an echo suppressor.

11. The method of claim 9, wherein controlling application of multi-channel decorrelation comprises enabling or disabling the application of multi-channel decorrelation to the audio signals to be played back via the one or more speakers based on the ERL measure.

12. The method of claim 9, wherein controlling application multi-channel decorrelation comprises changing a degree to which multi-channel decorrelation is applied to audio signals to be played back via the one or more speakers based on the ERL measure.

13. The method of claim 8, wherein obtaining the measure of coupling comprises obtaining at least one of:
a measure of correlation between a first audio signal played back by the one or more speakers and a second audio signal received by the at least one microphone;
an echo return loss enhancement (ERLE) measure; and
an echo dispersion measure.

14. The method of claim 8, wherein the method is performed by the audio device or a server that is connected to the audio device via a network.

15. A telephony device, comprising:
at least one speaker;
a microphone;
tracking logic configured to obtain a measure of coupling between the at least one speaker and the microphone by obtaining at least one of: an echo return loss (ERL) measure, a measure of correlation between a first audio signal played back by the at least one speaker and a second audio signal received by the microphone, an echo return loss enhancement (ERLE) measure, or an echo dispersion measure; and sidetone logic configured to control generation of a sidetone for playback via the at least one speaker based on the measure of coupling.

16. The telephony device of claim 15, wherein the ERL measure comprises an ERL measure obtained from an echo canceller or an echo suppressor.

17. The telephony device of claim 15, wherein the sidetone logic is configured to control generation of a sidetone by enabling or disabling the generation of the sidetone based on the measure of coupling.

18. The telephony device of claim 15, wherein the sidetone logic is configured to control generation of a sidetone by changing a degree to which the sidetone is generated based on the measure of coupling.

19. The telephony device of claim 15, wherein the tracking logic is further configured to obtain the measure of coupling by obtaining a bass measure based on at least the ERL measure.

20. The telephony device of claim 15, wherein the sidetone logic is further configured to control generation of the sidetone during an active telephone call.

* * * * *